United States Patent [19]

Kveglis et al.

[11] Patent Number: 5,026,755

[45] Date of Patent: Jun. 25, 1991

[54] WATER-BASED PRINTING INK PREPARED FROM POLYAMIDE/ACRYLIC GRAFT COPOLYMERS

[75] Inventors: Albert A. Kveglis, Pine Brook; Robert J. Catena, Orange, both of N.J.

[73] Assignee: Sun Chemical Corporation, Fort Lee, N.J.

[21] Appl. No.: 376,078

[22] Filed: Jul. 5, 1989

Related U.S. Application Data

[60] Division of Ser. No. 166,143, Mar. 10, 1988, Pat. No. 4,870,139, which is a continuation-in-part of Ser. No. 776,757, Sep. 16, 1985, abandoned, which is a continuation-in-part of Ser. No. 711,219, Mar. 13, 1985, abandoned.

[51] Int. Cl.$^5$ .................. C09B 23/00; C09B 69/00; C09D 1/00; C09D 11/10
[52] U.S. Cl. ........................... 524/389; 524/457; 524/504; 524/514; 106/20
[58] Field of Search ............... 524/389, 457, 504, 514

[56] References Cited

U.S. PATENT DOCUMENTS

| | | | |
|---|---|---|---|
| 4,136,076 | 1/1979 | Daniels | 260/29.6 HN |
| 4,177,076 | 12/1979 | Sato | 106/32 |
| 4,329,266 | 5/1982 | Suzuki et al. | 524/376 |

FOREIGN PATENT DOCUMENTS

| | | | |
|---|---|---|---|
| 57-53512 | 3/1982 | Japan | 283/4 |

*Primary Examiner*—Ana L. Carrillo
*Attorney, Agent, or Firm*—Jack Matalon

[57] ABSTRACT

A water-dispersible graft copolymer of a polyamide and at least one acrylic monomer is prepared by reacting the polyamide with the acrylic monomer(s) in an alcohol solution in the presence of a free radical peroxidic initiator. The graft copolymer is particularly useful as the resin component of a water-based printing ink.

30 Claims, No Drawings

WATER-BASED PRINTING INK PREPARED FROM POLYAMIDE/ACRYLIC GRAFT COPOLYMERS

CROSS REFERENCE TO RELATED APPLICATIONS

This is a divisional of Ser. No. 07,166,143, filed Mar. 10, 1988, now U.S. Pat. No. 4,870,139, which is a continuation-in-part of application Ser. No. 776,757 filed Sept. 16, 1985 (now abandoned) which in turn is a continuation-in-part of application Ser. No. 711,219, filed Mar. 13, 1985 (now abandoned).

SUMMARY OF THE INVENTION

This invention relates to graft copolymers of polyamides with acrylic monomers as well as to novel processes for preparing such graft copolymers. This invention also relates to aqueous varnishes prepared from such copolymers as well as to water-based inks prepared from such aqueous varnishes.

BACKGROUND OF THE INVENTION

The use in printing inks of polyamide resins and of acrylic resins is known. The use of polyamide resins in inks imparts to them excellent bond strength, adhesion, gloss, and printability. They are not, however, useful for aqueous inks because they are not water-dispersible. On the other hand, acrylic resins can be made water-dispersible, but they do not impart to inks the desirable properties obtainable with polyamides. These two resins are generally incompatible, since upon mixing solutions of the two they will separate into different phases.

Ideally a copolymer of these two incompatible polymers would result in an excellent water-based ink but such copolymers have not been readily produced.

BRIEF DESCRIPTION OF THE INVENTION

Acrylic monomers are grafted onto polyamides resulting in graft copolymers that retain the desirable properties of each component. The process for preparing the graft copolymers involves reacting the polyamide with at least one acrylic monomer in an alcohol solvent in the presence of a free radical peroxidic initiator to obtain an alcohol solution of the graft copolymer. In order to produce an aqueous varnish, the alcohol solution of the graft copolymer is treated to adjust the pH to at least 7 and then mixed with water. To produce a water-based ink, the desired pigment(s) are mixed with the aqueous varnish and diluted with water to the desired tinctorial strength.

DETAILED DESCRIPTION OF THE INVENTION

The Polyamide

The techniques for preparing polyamides are well known in the prior art. Such techniques involve combining one or more mono-and/or di-carboxylic acids with one or more monomeric and/or polymeric diamines to form the acid salt; the ratios of acid and diamine components are chosen such that a high degree of polymerization will result. The polyamide is readily obtained by heating the salt so as to release water and form the polyamide.

Exemplary prior art disclosing polyamides include U.S. Pat. No. 3,412,115 which discloses polyamides prepared from a polymeric fatty acid; a hexanoic acid and an alkylene diamine. Other prior art patents disclosing polyamides useful for the purposes of this invention include U.S. Pat. Nos. 3,778,394 and Re. 28,533 as well as British Patent no. 1,236,088.

Typically the polyamide is prepared from: (a) a carboxylic acid selected from this group consisting of acids derived from the thermal polymerization of soya or tall oil fatty acids, $C_2$–$C_{25}$ dicarboxylic acids, $C_1$–$C_{24}$ monocarboxylic acids and mixtures thereof and (b) a diamine selected from the group consisting of monomeric diamines and polymeric diamines having the respective general formulas $H_2N$-$R'$-$NH_2$ and $H_2N$-$[R')_2NH]_n(R')_2$-$NH_2$ and mixtures of such monomeric and polymeric diamines, wherein $R'$ is a $C_2$–$C_{20}$ aliphatic, aromatic or cycloaliphatic hydrocarbon radical and $n=1$ to 3.

The thermal polymerization of the soya or tall oil fatty acids will result in mixtures of dimerized acids, trimerized acids plus higher polymeric acids as well as unreacted monomeric acids, depending on the nature of the starting material and the reaction conditions. Various grades are available ranging from 97 wt. % dimer content to more than 35 wt. % trimer content. For the purposes of this invention, it is preferred that the acids derived from the thermal polymerization of soya or tall oil fatty acids have a dimeric acid content of about 83 to about 95% by weight.

Useful $C_2$–$C_{25}$ dicarboxylic acids include oxalic acid, fumaric acid, maleic acid, malonic acid, succinic acid, glutaric acid, pimelic acid, suberic acid, azelaic acid, sebacic acid, 1,12-dodecanedioic acid, phthalic acid, isophthalic acid, terephthalic acid, 1,3- and 1,4-cyclohexane dicarboxylic acids, naphthalene dicarboxylic acid and $C_5$–$C_{21}$ cycloaliphatic dicarboxylic acids. Preferred dicarboxylic acids are aliphatic diacids having at least 6 and preferably 6–12 carbon atoms such as adipic acid and azelaic acid.

A wide variety of monocarboxylic acids can be employed to prepare polyamides. These may be represented by the general formula: RCOOH where R-$C_1$–$C_{24}$ alkyl, cycloalkyl or aryl. Representative of alkyl include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl and isomers thereof. Examples of cycloaklyl include cyclopropyl, cyclobutyl, cyclopentyl, cyclohexyl and the like. The term aryl includes phenyl, naphthyl and alkyl substituted derivatives thereof. Preferred monocarboxylic acids include acetic acid, propionic acid, 2-ethylhexoic acid, pelargonic acid, decanoic acid, myristic acid, hexadecanoic acid, palmitic acid, stearic acid, oleic acid, linoleic acid, benzoic acid, salicyclic acid and mixtures thereof.

The diamines employed in preparing polyamides include aliphatic, cycloaliphatic or aromatic monomeric diamines of the formula $H_2N$-$R'$-$NH_2$ where $R'$ is a $C_2$–$C_{20}$ aliphatic, aromatic or cycloaliphatic hydrocarbon radical. Among the preferred diamines are ethylenediamine, 1,2-propylenediamine, 1,3-propylenediamine, 1,4-diaminobutane, p-xylylenediamine, m-xylylenediamine, piperazines, 1,6-hexamethylenediamine, 1,5-pentamethylenediamine, 4,4'-methylenebis (cyclohexylamine), 1,2-diaminocyclohexane, 2,2-bis (4-cyclohexylamino) propane, isophoronediamine, polyglycoldiamines, cyclohexanebis (methylamine), bis-1,4-(2'-aminoethyl) benzene and the like. Polymeric diamines useful in preparing polyamides include those defined by the formula: $H_2N-[(R')_2NH]_n(R')_2-NH_2$ where R' is defined as above and n = 1 − 3. Preferred polymeric diamines in this category are diethylenetriamine, triethylenetetramine, tetraethylenepentamine and the like.

Preferably, the polyamide is prepared from components wherein the carboxylic acid component comprises a mixture of: (i) acids having a dimeric content which are derived from the thermal polymerization of soya or tall oil fatty acids, and (ii) a dicarboxylic acid and optionally (iii) a monocarboxylic acid and the diamine component comprises a mixture of monomeric diamines.

Polyamides prepared from a mixture of the acids having a dimeric acid content of at least 83 wt. %, azelaic acid and a mixture of ethylenediamine and piperazine or hexamethylenediamine are especially useful for this invention. Also quite useful are those polyamides in which the mixture of acids includes a monocarboxylic acid such as propionic acid.

In those cases where the graft copolymer of the polyamide and the acrylic monomer is to be utilized for preparing an aqueous varnish which in turn is to be used for preparing a water-based ink, it is essential that the polyamide be one which has a weight average molecular weight of at least about 15,000 (as determined by gel permeation chromatography using polystyrene standards). Weight average molecular weights are more important than number average molecular weights for the purposes of the present invention, since there is a correlation between the former and high bond strengths and other physical properties of water-based inks, whereas number average molecular weights relate to chemical properties.

When graft copolymers based on polyamides having weight average molecular weights of at least about 15,000 are employed to prepare water-based printing inks, such inks exhibit high stability and high bond strengths of at least 300 grams per linear inch and in many cases at least 400 grams per linear inch (as measured on an Instron bond strength tester). High bond and other physical properties of ink films are determined by the weight average molecular weight of the polymer. In contrast thereto, chemical properties of the ink films are determined by the number average molecular weight of the polymer.

It has been found that with lower weight average moleculer weight polyamides (i.e. those having weight average molecular weights below 15,000) the resultant copolymer has been observed to be less stable in that the viscosity of the copolymer solution changes upon standing resulting in gellation which sets the mass rendering the copolymer solution unsuitable for an ink formulation. In addition with such lower weight average molecular weight polyamides, the resultant copolymer generally exhibits a bond strength of below 300 grams/linear inch as measured on an Instron bond strength tester, which is unsuitable for ink applications, such as a laminating ink, where high bond strength is needed to prevent the ink from separating from the film surface upon lamination resulting in spotting and decaling.

The Acrylic Monomer(s)

Acrylic monomers useful in the present invention are derivatives of propenoic acid (acrylic acid), and 2-methylpropenoic acid (methacrylic acid). Besides the acids themselves, their derivatives, either alone or in combinations, may be used in the present invention.

These derivatives can be represented by the general formula:

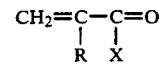

where R = H or $CH_3$ and X = OR' or $NR''_2$ where R' = H, $C_1$—$C_{18}$ alkyl or cycloalkyl, 2-hydroxyethyl, hydroxypropyl, hydroxybutyl or 2-cyanoethyl and R'' = H, $CH_3$, $CH_2OR'''$ where R''' = H, $CH_3$ or $C_2H_5$, $C_3H_7$, $C_4H_9$ Preferably, the acrylic monomer is selected from the group consisting of methylmethacrylate, ethylacrylate, hydroxyethylacrylate, hydroxypropylacrylate, ethylmethacrylate hydroxypropylmethacrylate, isobutylmethacrylate, t-butylmethacrylate, isobornylacrylate, isobornylmethacrylate, dicyclopentenyloxyethylacrylate, dicyclopentenyloxyethyl methacrylate, n-butylacrylate, n-butylmethacrylate, acrylic acid and mixtures thereof. The preferred acrylic monomers are those which are free of amino groups which result in a copolymer which exhibits poor solution stability (gels on standing).

The polyamide and the acrylic monomer(s) are generally added to the reaction solution in the ratios of about 5–95:95–5 parts by weight, and preferably in the ratios of about 40–90:60–10 parts by weight of polyamide to acrylic monomer(s).

The polyamide and the acrylic monomer(s) components are preferably each in solution in an alcohol when they are reacted. Any suitable alcohol can be used, examples including but not being limited to aliphatic alcohols, such as those having 1 to 4 carbon atoms, e.g., methanol, ethanol, propyl alcohol, butyl alcohols, and their mixtures.

Initiators for the free radical grafting of the polyamide and the acrylic monomer(s) include peroxidics such as acyl peroxides, dialkyl peroxides, peroxy esters, hydroperoxides, and the like in an amount of about 1% to 15% based on the weight of the acrylic monomer(s). The peroxidic free radical initiators are used as they promote grafting of the acrylic monomer(s) onto the polyamide. The peroxy ester is preferred as it promotes higher conversion of acrylic monomer to polymer as well as a higher degree of grafting onto the polyamide. In comparison, other free radical initiators such as azo compounds are unsuitable because of the lower conversion of acrylic monomer to polymer and the azo compounds do not tend to promote grafting on the polyamide.

The polymerization reaction is basically as follows:

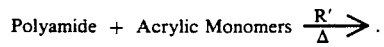

Polyamide + Polyamide-g-Acrylic + Acrylic Polymer. It generally takes place at a temperature within the range of about 60° to 150° C., and preferably within the range of about 75° to 115° C. Preferably the resultant copolymer solution has a viscosity of 5 to 250 poises at 40 to 50% solids as measured on a Brookfield viscometer at room temperature.

By the process of this invention there is obtained a grafting of at least one acrylic monomer onto a polyamide backbone, resulting in a polyamide with grafted acrylic side chains. The acrylic monomers are grafted to the polyamide via abstraction of allylic H atoms onto the dimer acid portion of the polyamide.

By the free radical grafting process of this invention, polyamides and acrylic monomers that normally are incompatible are graft copolymerized to a product that not only retains the excellent bond strength, adhesion, gloss and printability of the alcohol-soluble polyamide, but also imparts water dispersability via the grafted carboxyl groups of the acrylic monomer(s) segment, making them extramely suitable for use as varnishes for water-based, e.g., flexographic and gravure printing inks for substrates such as packaging films.

For the purposes of preparing an aqueous varnish (i.e. a dispersion or suspension of the resin component in water), it is desirable that at least about 15 wt. %, preferably at least 20 wt. %, based on the weight of the resin component, consist of the graft copolymer of the polyamide and the acrylic monomer(s). The remainder of the resin component will comprise unreacted polyamide and polymers of the acrylic monomer(s). It is also desirable to neutralize the graft copolymer to a pH of at least 7, preferably to a pH in the range of 7 to 10, prior to preparation of the aqueous varnish. Since the graft copolymer is acidic in nature, water dispersability is difficult to achieve absent such neutralization. For the purposes of this invention, water-dispersability is intended to mean the ability to form a homogenous aqueous colloidal dispersion as opposed to a non-homogenous dispersion containing at least two phases.

Neutralization of the copolymer is preferably accomplished by an amine. Such neutralization provides a significant advantage in that during printing and drying the volatile amines would not be expected to corrode the equipment as would volatile acids such as hydrochloric acid, acetic acid, etc. which are used to neutralize (and solubilize) amine-functional copolymers common in the art. Preferred amines for neutralization include ammonia, dimethanolamine, diethanolamine, 2-methyl-2-aminopropanol, triethylamine, N,N-diethylethanolamine, N,N-dimethyl-2-methyl-2-aminopropanol and the like.

To Prepare the aqueous varnish, the alcohol solution of the graft copolymer is prepared as described above. From 15 to 40% of the solvent is desirably distilled off and the graft copolymer is then neutralized to a pH above about 7. The resultant solution is then blended with a sufficient amount of water in a high speed blender such that there will be typically 10 to 40 wt. %, preferably 20-30 wt. %, solids (i.e. resin component) in the aqueous varnish. If desired, the neutralization and blending with water may take place as a single step, but it is preferred to carry out these steps sequentially.

To prepare a water-based ink from the aqueous varnish, the pigment, aqueous varnish and water (preferably a 4:1 water:ethanol blend) are blended in a high speed mixer or a ball mill. Typically, a water-based ink will contain 5 to 65, preferably 10 to 50 wt. %, based on the total weight of the ink, of the pigment which may be materials such as titanium dioxide, red lake c cyan blue, diarylide yellow, carbon black, bon red, cyan green. diarylide orange and mixtures thereof. Desirably up to 10 wt. %. based on the weight of the ink, of an anti-foam agent such as acetylenic diols, octyl alcohols, isopropyl alcohol, silicones etc. is also added. The aqueous varnish is present in the water-based ink such that there will be 10 to 30 wt. % solids (i.e. resin component), based on the weight of the ink.

This invention is illustrated by the following examples wherein all parts and percentages are by weight (unless otherwise specified).

EXAMPLE 1

(A) 210 parts of a polyamide (weight avg. mol. wt. of 28,000) prepared from the thermal polymerization of tall oil fatty acid and having a dimeric acid content of about 95 wt. %, azelaic acid, piperazine and ethylene diamine and 362.3 parts of n-propyl alcohol were charged into a four-neck round bottom flask under a blanket of nitrogen and slowly heated to reflux with agitation. At reflux the polyamide was totally dissolved.

Then a mixture of 51.7 parts of methyl methacrylate, 28.5 parts of glacial acrylic acid, 8.92 parts of hydroxypropyl methacrylate 92.1 parts of n-propyl alcohol, and 2.94 parts of benzoyl peroxide was added dropwise to the polyamide solution over a period of 1-¼ hour while maintaining reflux at 95-100° C.

(B) One hour later, ¼ of a mixture of 2.68 parts of benzoyl peroxide and 20.7 parts of methyl ethyl ketone were added; and the remainder was added incrementally every hour thereafter for 3 hours. Refluxing was continued until a determination of solids indicated complete conversion of the acrylic monomers.

The product was then cooled to room temperature and discharged.

The resulting graft copolymer had a weight ratio of 70/30 polyamide/acrylic monomers, a solution viscosity of 24 poises at 40% solids, and exhibited good stability in that the solution viscosity did not change over time.

EXAMPLE 2

(A) 337 parts of the same polyamide as employed in Example 1 and 530 parts of n-propyl alcohol were charged into a stainless steel reactor. The mixture was heated to reflux (97° C.) under a blanket of nitrogen.

Then a mixture of 11.9 parts of tert-butyl methacrylate, 11.9 parts of ethyl acrylate, 29.7 parts of glacial acrylic acid, 5.9 parts of hydroxyethyl acrylate, 59.5 parts of n-propyl alcohol, and 2.0 parts of 97% t-butyl neodecanoate was added over a period of one hour under reflux. The batch was held under reflux for an additional hour.

(B) One hour later ¼ of a mixture of 9.9 parts of n-propyl alcohol and 1.8 parts of t-butyl neodecanoate were added and the remainder was added incrementally every hour thereafter for 3 hours.

The reaction was continued until the product contained 40% nonvolatile solids. 200 Parts of solvent was then distilled off, the product cooled 60° C. and filtered.

The resulting graft copolymer had a polyamide/acrylic monomers ratio of 85/15 by weight, a solids content of 50.2%, a viscosity of 121 poises at 25° C., and a theoretical acid value of 44, and exhibited good stability in that the viscosity did not change over time.

EXAMPLE 3

The procedure of Example 2 was repeated except that the polyamide (weight average molacular weight of 28,000) was prepared with sebacic acid instead of azelaic acid. The resultant graft copolymer solution exhibited inferior stability compared to the graft copolymer solution of Example 2 as the viscosity increased over time.

EXAMPLE 4

216.0 Parts of an alcohol-soluble polyamide (weight average molecular weight of 5,000) prepared from ethylene diamine, hexamethylene diamine, propionic acid, and the same fatty acid employed in Example 1 and 329.9 parts of n-propyl alcohol were charged into a four-neck round bottom flask under a nitrogen blanket and slowly heated to reflux with agitation. At reflux, the polyamide had totally dissolved.

Then a mixture of 24.0 parts of glacial acrylic acid, 24.0 parts of n-propyl alcohol, and 0.79 part of benzoyl peroxide was added dropwise to the polyamide solution over a one-hour period while maintaining reflux at 95-100° C.

(B) One hour later, ¼ of a mixture of 0.72 part of benzoyl peroxide in 6.1 parts of methyl ethyl ketone was added; the remainder was added at hourly intervals in 3 equal increments.

(C) Three hours later, a solution of 0.72 parts of benzoyl peroxide in 6.1 parts of methyl ethyl ketone was added. Refluxing was continued until a solids determination indicated complete conversion of the acrylic monomer.

Twenty percent of the solvent was then distilled off to remove traces of reactants.

The resulting graft copolymer had a weight ratio of 90/10 polyamide/acrylic monomers, a viscosity of 15 poises at 45% solids, but exhibited poor stability in that the viscosity increased over time.

EXAMPLE 5

Flexographic Printing Ink (A) 60.8 Parts of the product of Example 2 was mixed with 31.8 parts of water, 3.4 parts of ethanol, 2.0 parts of 28% aqua ammonia, and 2.0 parts of diethylethanolamine.

(B) To 48.5 parts of the neutralized aqueous varnish of part (A) were added with high speed mixing 26.1 parts of titanium dioxide and 25.4 parts of an 80/20 blend of water/ethanol, resulting in a white ink.

(C) The ink was applied by means of a flexographic hand proofer to polypropylene film. The ink had good printability, gloss, stability, adhesion, a bond strength of at least 400 grams/linear inch as measured on an Instron bond strength tester, and good crinkle resistance.

EXAMPLE 6

To illustrate the need for graft copolymerizing the acrylic monomer(s) onto the polyamide, the following experiment was carried out:

The procedure of Example 1 was repeated except that the acrylic monomers were polymerized in the absence of a polyamide. The polymerized acrylates were then added to the polyamide solution. The two solutions were incompatible, and precipitation of the acrylic polymers occurred.

EXAMPLE 7

A polyamide/acrylic graft copolymer was prepared as follows:

| (1) | Polyamide (weight average molecular weight of about 11,000) | 408.0 parts |
|---|---|---|
| (2) | n-propanol | 642.6 |
| (3) | Isobutylmethacrylate | 14.4 |
| (4) | Methylmethacrylate | 14.4 |
| (5) | Acrylic Acid | 36.0 |
| (6) | Hydroxypropylacrylate | 7.2 |
| (7) | t-butylperoctoate | 2.38 |
| (8) | n-propanol | 72.0 |
| (9) | t-butylperoctoate | 2.16 |
| (10) | n-propanol | 12.2 |

(A) 408 Parts of a polyamide prepared from the same fatty acid as in with a dimerized acid content of 83% and a trimerized acid content of 17%, propionic acid, azelaic acid, ethylene diamine, and hexamethylene diamine and 642 parts of n-propyl alcohol were charged into a four-neck round bottom flask under a blanket of nitrogen and slowly heated to reflux with agitation. At reflux, the polyamide had totally dissolved.

Then a mixture of 14.4 parts isobutylmethacrylate, 14.4 parts methylmethacrylate, 36.0 parts of glacial acrylic acid, 7.2 parts of hydroxypropylacrylate, 72.0 parts of n-propyl alcohol, and 2.38 parts of t-butylperoctoate was added dropwise to the polyamide solution over a period of 1¼ hour while maintaining reflux at 95-100° C.

(B) One hour later, ¼ of a mixture of 2.16 parts of t-butylperoctoate and 12.2 parts of n-propanol was added, the remainder was added three times at hourly intervals. Refluxing was continued until a determination of solids indicated complete conversion of the acrylic monomers. The product was then cooled to room temperature and discharged at 45% solids. The resulting graft copolymer had a weight ratio of 85/15 of polyamide/acrylic monomers and a solution viscosity of 8 poises, as measured on a Brookfield viscomster at 45% solids and at room temperature.

| (1) | Polyamide/acrylic graft copolymer composition of Example 7 | 60.1 parts |
|---|---|---|
| (2) | Water | 36.1 |
| (3) | Diethylethanolamine | 1.9 |
| (4) | Ammonium hydroxide solution | 1.9 |

These ingredients were placed into an Osterizer and mixed for approximately 15 minutes. The resultant varnish was cooled to room temperature and poured off.

| (1) | Varnish (as above) | 55.0 parts |
|---|---|---|
| (2) | Titanium dioxide | 25.0 |
| (3) | 80/20 (w/w) water/ethanol | 10.0 |

These ingredients were placed into an Osterizer and mixed for approximately 30 minutes. The resultant ink was cooled to room temperature and adjusted to a 25 second reading on a Zahn #2 cup using a mixture of 80/20 by weight of water/ethanol as the reducing solvent. The PH was adjusted to 9.0-9.5 with additional amines as required. The final ink exhibited good printability; however, both stability and bond strengths of the ink were observed to be inferior. Instability was exhibited in that after 24 hours the ink exhibited a large increase in viscosity. The laminating bond strength was 50-80 grams/linear inch as measured on a Instron bond strength tester.

EXAMPLE 8

| (1) | Polyamide | 204.0 parts |
|---|---|---|

|   |   |   |
|---|---|---|
| | (weight average molecular weight of about 15,000) | |
| (2) | n-propanol | 321.0 |
| (3) | Methylmethacrylate | 7.2 |
| (4) | Isobutylmethacrylate | 7.2 |
| (5) | Acrylic Acid | 18.0 |
| (6) | Hydroxypropylacrylate | 3.6 |
| (7) | t-butylperoctoate | 1.19 |
| (8) | n-propanol | 36.0 |
| (9) | t-butylperoctoate | 1.08 |
| (10) | n-propanol | 6.10 |

The reaction was carried out with the same procedure as that used in Example 7. The graft copolymer had a weight ratio of 85/15 of polyamide/acrylic monomers and a viscosity of 20 poises at 45% solids. The resultant aqueous ink exhibited good adhesion printability, stability, crinkle resistance (both dry and with water) and block resistance on polyolefin films. The bond strength was greater than 500 grams/linear inch, as measured on a Instron bond strength tester.

EXAMPLE 9

|   |   |   |
|---|---|---|
| (1) | Polyamide | 204.0 |
| | (weight average molecular weight of about 5,000) | |
| (2) | n-propanol | 321.3 |
| (3) | Methylmethacrylate | 7.28 |
| (4) | Isobutylmethacrylate | 7.2 |
| (5) | Acrylic Acid | 18.0 |
| (6) | Hydroxypropylacrylate | 3.6 |
| (7) | t-butylperoctoate | 1.19 |
| (8) | n-propanol | 36.0 |
| (9) | t-butylperoctoate | 1.08 |
| (10) | n-propanol | 6.10 |

The reaction was carried out with the same procedure as that used in Example 7. An ink could not be prepared as the graft copolymer solution was unstable resulting in the physical gelling of the varnish.

EXAMPLE 10

|   |   |   |
|---|---|---|
| (1) | Polyamide of Example 1 | 204.0 parts |
| | (weight average molecular weight of about 28,000) | |
| (2) | n-propanol | 321.3 |
| (3) | Isobornylmethacrylate | 7.2 |
| (4) | Isobutylmethacrylate | 7.2 |
| (5) | Acrylic Acid | 18.0 |
| (6) | Hydroxypropylacrylate | 3.6 |
| (7) | t-butylperoctoate | 1.19 |
| (8) | n-propanol | 36.0 |
| (9) | t-butylperoctoate | 1.0 |
| (10) | n-propanol | 6.1 |

The reaction was carried out following the procedure of Example 7. The graft copolymer had a weight ratio of 85/15 of polyamide/acrylic monomers and a solution viscosity of 53 poises at 45% solids. The resultant aqueous ink exhibited good adhesion, printability, stability, crinkle resistance and block resistance with a bond strength of greater than 500 grams/linear inch as measured on an Instron bond strength tester.

EXAMPLE 11

|   |   |   |
|---|---|---|
| (1) | Polyamide | 210.0 parts |
| | (weight average molecular weight of about 45,000) | |
| (2) | n-propanol | 363.3 |
| (3) | Isobutylmethacrylate | 26.8 |
| (4) | Isobornylmethacrylate | 25.0 |
| (5) | Acrylic Acid | 28.5 |
| (6) | Hydroxypropylacrylate | 8.9 |
| (7) | t-butylperoctoate | 2.94 |
| (8) | n-propanol | 92.1 |
| (9) | t-butylperoctoate | 2.68 |
| (10) | n-propanol | 2.68 |

The reaction was carried out following the procedure of Example 7. The graft copolymer had a weight ratio of 70/30 of polyamide/acrylic monomers and a viscosity of 200 poises at 45% solids. The resultant aqueous ink exhibited good adhesion, printability, stability, crinkle resistance and block resistance with a bond strength of greater than 400 grams/linear inch as measured on an Instron bond strength tester.

EXAMPLE 12

|   |   |   |
|---|---|---|
| (1) | Polyamide of Example 1 | 168.0 parts |
| | (weight average molecular weight of about 28,000) | |
| (2) | n-propanol | 288.71 |
| (3) | Methylmethacrylate | 40.8 |
| (4) | Acrylic Acid | 24.0 |
| (5) | Dimethylaminoethylmethacrylate | 7.2 |
| (6) | t-butylperoctoate | 2.38 |
| (7) | n-propanol | 72.0 |
| (8) | t-butylperoctoate | 2.16 |
| (9) | n-propanol | 6.1 |

The reaction was carried out following the procedure of Example 7. As the acrylate monomer contained an amino group, the ink prepared from the resultant graft copolymer exhibited poor printability and poor storage stability in that the viscosity increased over time.

EXAMPLE 13

|   |   |   |
|---|---|---|
| (1) | Polyamide of Example 1 | 210.0 parts |
| | (Weight average molecular weight of 28,000) | |
| (2) | n-propanol | 363.3 |
| (3) | Isobutylmethacrylate | 26.8 |
| (4) | Isobornylmethacrylate | 25.0 |
| (5) | Acrylic Acid | 28.5 |
| (6) | Hydroxypropylacrylate | 8.9 |
| (7) | n-propanol | 92.1 |
| (8) | Azobisisobutyronitrile | 2.94 |
| (9) | n-propanol | 2.68 |
| (10) | Azobisisobutyronitrile | 2.68 |

The reaction was carried out following the procedure of Example 7. An ink could not be prepared from this varnish due to its lack of water-dispersability even after neutralization. This Example illustrates the importance of the type of free radical initiator employed in the copolymerization reaction.

What is claimed is:

1. A water-based printing ink comprising
(a) a resin component, said resin component comprising at least about 15 wt. %, based on the weight of the resin component, of a graft copolymer of a polyamide and at least one acrylic monomer, said polyamide having a weight average molecular weight of at least about 15,000, the remainder of the resin component comprising unreacted polyamide and polymers of said acrylic monomer, said graft copolymer having a pH of at least (b) water; and (c) at least one pigment.

2. The ink of claim 1 wherein the resin component comprises at least 20 wt. % of said graft copolymer.

3. The ink of claim 1 wherein the resin component is present in an amount of about 10 to about 30 wt. %, based on the weight of the ink.

4. The ink of claim 1 wherein the graft copolymer has a pH in the range of 7 to 10.

5. The ink of claim 1 wherein the resin component is present as a solution in alcohol, such solution having a viscosity of about 5 to about 250 poises at about 40 to about 50% solids as measured at room temperature.

6. The ink of claim 5 wherein the alcohol is $C_1$-$C_4$ aliphatic alcohol.

7. The ink of claim 1 wherein the pigment is selected from the group consisting of titanium dioxide, red lake c, cyan blue, diarylide yellow, carbon black, bon red, cyan green, diarylide orange and mixtures thereof.

8. The ink of claim 1 wherein the pigment is present in an amount of about 5 to about 65 wt. %, based on the weight of the ink.

9. The ink of claim 1 including an anti-foam agent present in an amount up to about 10 wt. %, based on the weight of the ink.

10. The ink of claim 1 wherein the polyamide is prepared from: (a) a carboxylic acid selected from the group consisting of acids derived from the thermal polymerization of soya or tall oil fatty acids, $C_2$-$C_{25}$ dicarboxylic acids, $C_1$-$C_{24}$ monocarboxylic acids and mixtures thereof and (b) a diamine selected from the group consisting of monomeric diamines and polymeric diamines having the respective general formulas $H_2N$-$R'$-$NH_2$ and $H_2N$-$[(R')_2NH]_n$-$(R')_2$-$NH_2$ and mixtures of such monomeric and polymeric diamines, wherein $R'$ is a $C_2$-$C_{20}$ aliphatic, aromatic or cycloaliphatic hydrocarbon radical and $n=1$ to 3.

11. The ink of claim 10 wherein the acids derived from the thermal polymerization of soya or tall oil fatty acids have a dimeric acid content of about 83 to about 95% by weight.

12. The ink of claim 1 wherein a carboxylic acid and a diamine are employed in preparing the polyamide such acid comprising a mixture of: (i) acids having a dimeric acid content of at least 83 weight % which are derived from the thermal polymerization of soya or tall oil fatty acids and (ii) a dicarboxylic acid, and such diamine comprising a mixture of monomeric diamines.

13. The ink of claim 12 wherein the dicarboxylic acid is azelaic acid and the monomeric diamines are ethylenediamine and piperazine.

14. The ink of claim 1 wherein a carboxylic acid and a diamine are employed in preparing the polyamide such acid comprising a mixture of: (i) acids having a dimeric acid content of at least 83 weight % which are derived from the thermal polymerization of soya or tall oil fatty acids, (ii) a dicarboxylic acid and (iii) a monocarboxylic acid and such diamine comprising a mixture of monomeric diamines.

15. The ink of claim 14 wherein the dicarboxylic acid is azelaic acid, the monocarboxylic acid is propionic acid and the monomeric diamines are ethylenediamine and hexamethylenediamine.

16. The ink of claim 1 wherein the acrylic monomer is selected from the group having the general formula

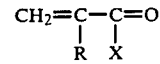

wherein R is hydrogen or methyl and X is $OR'$ or $NR_2''$ in which $R'$ is hydrogen, $C_1$-$C_{18}$ alkyl or cycloalkyl, 2-hydroxethyl, hydroxypropyl, hydroxybutyl or 2-cyanoethyl, and $R''$ is hydrogen, methyl or $CH_2OR'''$ in which $R'''$ is hydrogen, methyl, ethyl, propyl or butyl.

17. The ink of claim 16 wherein the acrylic monomer is selected from the group consisting of methylmethacrylate, ethylacrylate, hydroxyethylacrylate, hydroxypropylacrylate, ethylmethacrylate, hydroxypropylmethacrylate, isobutylmethacrylate, tert. butylmethacrylate, isobornylacrylate, isobornylmethacrylate, dicyclopentenyloxyethylacrylate, dicyclopentenyloxyethylmethacrylate, n-butylacrylate, n-butylmethacrylate, acrylic acid and mixtures thereof.

18. An aqueous varnish comprising:

(a) a resin component present as a solution in a $C_1$-$C_4$ alcohol, said resin component comprising at least about 15 wt. %, based on the weight of the resin component, of a graft copolymer of a polyamide and at least one acrylic monomer, said polyamide having a weight average molecular weight of at least about 15,000, the remainder of the resin component comprising unreached polyamide and polymers of said acrylic monomer, said graft copolymer having a pH of at least 7, the resin component being present in an amount of about 10 to about 40 wt. % solids, based on the weight of the aqueous varnish; and (b) water.

19. The aqueous varnish of claim 18 wherein the resin component is present in an amount of 20 to 30 wt. % solids based on the weight of the aqueous varnish.

20. The aqueous varnish of claim 18 wherein the resin component comprises at least 20 wt. % of said graft copolymer.

21. The aqueous varnish of claim 18 wherein the graft copolymer has a pH in the range of 7 to 10.

22. The aqueous varnish of claim 18 wherein the $C_1$-$C_4$ alcohol solution of the resin component has a viscosity of about 5 to about 250 poises at about 40 to about 50% solids as measured at room temperature.

23. The aqueous varnish of claim 18 wherein the polyamide is prepared from (a) a carboxylic acid selected from the group consisting of acids derived from the thermal polymerization of soya or tall oil fatty acids, $C_2$-$C_{25}$ dicarboxylic acids, $C_1$-$C_{24}$ monocarboxylic acids and mixtures thereof and (b) a diamine selected from the group consisting of monomeric diamines and polymeric diamines having the respective general formulas $H_2N$-$R'$-$NH_2$ and $H_2N$-$[(R')_2NH]_n$-$(R')_2$-$NH_2$ and mixtures of such monomeric and polymeric diamines, wherein $R'$ is a $C_2$-$C_{20}$ aliphatic, aromatic or cycloaliphatic hydrocarbon radical and $n=1$ to 3.

24. The aqueous varnish of claim 22 wherein the acids derived from the thermal polymerization of soya or tall oil fatty acids have a dimeric acid content of about 83 to about 95% by weight.

25. The aqueous varnish of claim 18 such diamine comprising employed in preparing the polyamide comprises a mixture of: (i) acids having a dimeric acid content of at least 83 weight % which are derived from the thermal polymerization of soya or tall oil fatty acids and (ii) a dicarboxylic acid, and (b) the diamine comprises a mixture of monomeric diamines.

26. The aqueous varnish of claim 25 wherein the dicarboxylic acid is azelaic acid and the monomeric diamines are ethylenediamine and piperazine.

27. The aqueous varnish of claim 18 wherein a carboxylic acid and a diamine are employed in preparing the polyamide such acid comprising a mixture of: (i) acids having a dimeric acid content of at least 83 weight % which are derived from the thermal polymerization of soya or tall oil fatty acids, (ii) a dicarboxylic acid and (iii) a monocarboxylic acid and such diamine comprising a mixture of monomeric diamines.

28. The aqueous varnish of claim 27 wherein the dicarboxylic acid is azelaic acid, the monocarboxylic acid is propionic acid and the monomeric diamines are ethylenediamine and hexamethylenediamine.

29. The aqueous varnish of claim 18 wherein the acrylic monomer is selected from the group having the general formula

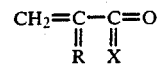

wherein R is hydrogen or methyl and X is OR' or NR$_2$" in which R' is hydrogen, C$_1$-C$_{18}$ alkyl or cycloalkyl, 2-hydroxethyl, hydroxypropyl, hydroxybutyl or 2-cyanoethyl, and R" is hydrogen, methyl or CH$_2$OR'" in which R'" is hydrogen, methyl, ethyl, propyl or butyl.

30. The aqueous varnish of claim 29 wherein the acrylic monomer is selected from the group consisting of methylmethacrylate, ethylacrylate, hydroxyethylacrylate, hydroxypropylacrylate, ethylmethacrylate, hydroxypropylmethacrylate, isobutylmethacrylate, tert. butylmethacrylate, isobornylacrylate, isobornylmethacrylate, dicyclopentenyloxyethylacrylate, dicyclopentenyloxyethylmethacrylate, n-butylacrylate, n-butylmethacrylate, acrylic acid and mixtures thereof.

* * * * *